US012207082B2

United States Patent
Seok et al.

(10) Patent No.: US 12,207,082 B2
(45) Date of Patent: *Jan. 21, 2025

(54) ENCRYPTION MECHANISM USED IN MULTI-BAND CHANNEL ACCESS

(71) Applicant: MediaTek Singapore Pte. Ltd., Solaris (SG)

(72) Inventors: Yongho Seok, San Jose, CA (US); Jianhan Liu, San Jose, CA (US); James Chih-Shi Yee, San Jose, CA (US); Gabor Bajko, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,143

(22) Filed: Jul. 10, 2023

(65) Prior Publication Data

US 2023/0354015 A1  Nov. 2, 2023

Related U.S. Application Data

(63) Continuation of application No. 16/521,471, filed on Jul. 24, 2019, now Pat. No. 11,716,613.

(Continued)

(51) Int. Cl.
*H04W 12/037* (2021.01)
*H04L 9/08* (2006.01)
(Continued)

(52) U.S. Cl.
CPC ......... *H04W 12/037* (2021.01); *H04L 9/0819* (2013.01); *H04L 61/50* (2022.05);
(Continued)

(58) Field of Classification Search
CPC . H04W 12/037; H04W 12/03; H04W 12/033; H04W 12/06; H04W 12/71;
(Continued)

(56) References Cited

U.S. PATENT DOCUMENTS 10,153,857 B1 * 12/2018 Chu ..................... H04W 72/21
2008/0273700 A1 * 11/2008 Wentink ............... H04L 1/1867
380/270

(Continued)

FOREIGN PATENT DOCUMENTS

EP   3276843 A1 *  1/2018   ............... H04B 1/56
JP   4154753 B2 *  9/2008
WO  2016159874 A1   10/2016

OTHER PUBLICATIONS

Ishii et al. Japanese Publication JP4154753B2 (machine translation) (Year: 2008).*

*Primary Examiner* — Robert B Leung
*Assistant Examiner* — Howard H. Louie (57) ABSTRACT

An encryption mechanism used on cooperative multi-band wireless STA architecture that enables full duplex operations. In encrypting a frame, an AAD can be constructed by using a selected MAC address, which may not be associated with a band to be used for transmitting the frame in an upcoming TXOP. An STA that supports simultaneous transmission in a multi-band operation uses the same MAC address to encrypt the frames to be transmitted on different bands. An AAD is constructed by using a same MAC address corresponding to one of the transceivers. A transmit STA may specify band information used for encryption in the MAC header, which serves to signal the receive STA to decrypt the frame by using the proper information.

18 Claims, 6 Drawing Sheets

Related U.S. Application Data (60) Provisional application No. 62/703,956, filed on Jul. 27, 2018.

(51) Int. Cl.
*H04L 61/50* (2022.01)
*H04W 12/03* (2021.01)
*H04W 12/033* (2021.01)
*H04W 12/06* (2021.01)
*H04W 12/71* (2021.01)
*H04W 74/0808* (2024.01)
*H04W 84/12* (2009.01)
*H04L 101/622* (2022.01)

(52) U.S. Cl.
CPC ......... *H04W 12/03* (2021.01); *H04W 12/033* (2021.01); *H04W 12/06* (2013.01); *H04L 2101/622* (2022.05); *H04W 12/71* (2021.01); *H04W 74/0808* (2013.01); *H04W 84/12* (2013.01)

(58) Field of Classification Search
CPC  H04W 74/0808; H04W 84/12; H04L 9/0819; H04L 61/50; H04L 2101/622
See application file for complete search history.

(56) References Cited

U.S. PATENT DOCUMENTS

| | | | |
|---|---|---|---|
| 2016/0157266 A1* | 6/2016 | Wang | H04W 72/23 370/336 |
| 2017/0019785 A1* | 1/2017 | Liu | H04L 63/08 |
| 2018/0242299 A1* | 8/2018 | Xin | H04L 5/001 |
| 2019/0335539 A1 | 10/2019 | Polacheck et al. | |
| 2019/0372653 A1* | 12/2019 | Chae | H04W 72/20 |

* cited by examiner

ENCRYPTION MECHANISM USED IN MULTI-BAND CHANNEL ACCESS

CROSS REFERENCE TO RELATED APPLICATION

This patent application is a continuation of and claims priority and benefit of the copending U.S. patent application Ser. No. 16/521,471, entitled "EHT TRANSMISSION PROTECTION MECHANISM IN 6 GHZ," filed on Jul. 24, 2019, and claims priority and benefit of the U.S. Provisional Patent Application No. 62/703,956, entitled "Multi-band Channel Access," filed on Jul. 27, 2018, the entire content of which are herein incorporated by reference for all purposes.

TECHNICAL FIELD

Embodiments of the present disclosure relate generally to the field of wireless network communication, and more specifically, to the field of multi-transceiver WIFI communication devices.

BACKGROUND OF THE INVENTION

Current wireless stations (STAs) compliant with predominant WIFI communication protocols are built for half-duplex operations which means that two stations (STAs) can communicate with each other, but cannot transmit simultaneously. That is, between two communicating STAs, data can only be transmitted in one direction at a time, usually in a manner of so-called "listen-before-talk" operation when in half-duplex.

Counter Mode with Cipher Block Chaining Message Authentication Code (CCMP) is a security protocol for data encryption, where counter-mode is used to provide data privacy, and cipher block chaining message integrity protocol is used for authentication and data integrity. To encrypt a frame, a CCM originator is provided with four inputs: a temporal key (TK), a nonce, a plaintext frame body of the Media Access Control (MAC) protocol data unit (MPDU), and an Additional Authentication Data (AAD) constructed from the MAC header of the MPDU.

In particular, an AAD is constructed from a receiver address (RA), a transmitter address (TA) and a Basic Service Set Identifier (BSSID). A nonce is a one-time value that is generated exclusively for the specific transaction. A CCMP header is created from the packet number (PN) and the Key ID. The AAD, nonce, and 128-bit TK are then input into the block cipher to create an encrypted data frame while performing a data integrity check. The TK, nonce, AAD, and plaintext are then processed to create the Message Integrity Check (MIC). The plaintext and the MIC are then encrypted into 128-bit blocks. The original MAC header is then appended to the CCMP header, the encrypted data and MIC, and a frame check sequence (FCS) to produce an encrypted MPDU.

Typically, for performance improvement, a frame is encrypted in this fashion before the transmitter acquires a transmission opportunity (TXOP) for it. For communication modes involving multiple bands, e.g., using multiple transceivers simultaneously, this can pose a problem.

SUMMARY OF THE INVENTION

Embodiments of the present disclosure are directed to systems and methods of using multiple transceivers, and correspondingly multiple channels, in a single WIFI station (STA), to enable full duplex communication between WIFI STAs, thereby enhancing transmission efficiency, data rate, throughput and flexibility of the wireless local area networks (WLANs). In such a full duplex system, an STA can execute a channel access in multiple WIFI bands independently. In some embodiments, the multiple transceivers and channels in the STA can be used to perform data transmission as peers. A cooperative management unit (CMU) in the STA may exchange or aggregate information between the transceivers such that data or other information may be transmitted or received in accordance with using the multiple channels. For example, one channel can offload a transmission or reception task, partially or entirely, to the other channel. A transmit STA can obtain an TXOP for a particular band at one time, or obtain contemporaneous TXOPs in multiple bands to transmit frames in these bands simultaneously and cooperatively.

Like in the single band access system, for reasons of improving performance, it is desirable to encrypt a frame before an TXOP is acquired in a multi-band access system. However, in the latter, until an TXOP is obtained, the transceivers on both the transmit and the receive ends, to be used for transmitting the specific frame, remain undetermined. The same is true with respect to the associated channel. That is, the band to be used to transmit the packet can change dynamically. Since each of the multiple transceivers has a different Basic Service Set Identifier (BSSID), and thus its own MAC address, it is difficult to predict which MAC address should be used to construct the required Additional Authentication Data (AAD) in the encryption process before the TXOP is obtained. This problem is solved in accordance with embodiments of the present invention.

One viable approach is to re-encrypt the frame once the TXOP is obtained. However, this may require extra STA processing time and decrease the network efficiency. This solution is not acceptable with respect to performance.

According to one disclosed embodiment, a method of wireless communication performed by a first wireless station (STA) comprising at least a first transceiver and a second transceiver is described. The method includes generating a first Media Access Control (MAC) address for the first transceiver and a second MAC address for the second transceiver, constructing an Additional Authentication Data (AAD) by using the first MAC address, encrypting a first frame using the AAD, the first transceiver and the second transceiver performing clear channel assessment (CCA) independently of each other, obtaining a first transmission opportunity (TXOP) on a second channel after encrypting, and in the first TXOP, the second transceiver transmitting the first frame on the second channel for receipt by a second wireless STA. The transmitting is performed without re-encrypting the first frame after obtaining the first TXOP.

According to some embodiments, the method further includes encrypting a second frame using the AAD, obtaining a second TXOP on the first channel, wherein the second TXOP is concurrent with the first TXOP, and the first transceiver transmitting the second frame for receipt by the second wireless STA wherein the second frame is transmitted simultaneously with the second transceiver transmitting the first frame.

According to some embodiments, the first transceiver and the second transceiver are operable to enable the first wireless STA to communicate with the second wireless STA in a full duplex manner.

According to some embodiments, the first channel is associated with a first set of virtual access points (APs) and the second channel is associated with a second set of virtual APs, wherein the first and second sets have a same Basic Serve Set Identifier (BSSID) set. The method further comprises selecting a first virtual AP from the first set and a second virtual AP from the second set, wherein the first and second virtual APs have a same BSSID, and associating the second transceiver with the first virtual AP and the second transceiver with the second virtual AP. The AAD is constructed using the same BSSID.

According to some embodiments, the first channel is associated with a first set of virtual access points (APs) and the second channel is associated with a second set of virtual APs, wherein the first and second sets have different Basic Serve Set Identifier (BSSID) sets, and wherein further the constructing the AAD comprises deriving a common BSSID for first set and second set of virtual APs.

According to some embodiments, the deriving comprises masking selected bits of each BSSID in the different BSSID sets to a same value and wherein further the different Basic Serve Set Identifier (BSSID) sets of first set and the second set are derived from a single reference BSSID.

According to some embodiments, the method further includes constructing a different AAD using the second MAC address, encrypting a third frame using the different AAD, obtaining a third TXOP on the first channel wherein the third TXOP is concurrent with the first TXOP, and the first transceiver transmitting the third frame to the second wireless STA simultaneously with the second transceiver transmitting the first frame.

According to some embodiments, the method includes setting an indication in a MAC header of the first frame to signal the second wireless STA to use channel information associated with the first channel for decryption and relay detection.

According to some embodiments, the channel information comprises Pairwise Transparent Key security Association (PTKSA), Group Transparent Key security Association, (GTKSA), Packet Number (PN) and relay counters, and the method includes maintaining respective channel information for the first channel and the second channel.

According to some embodiments, setting the indication comprises setting a control ID value in an A-control field to indicate multi-channel content in the first TXOP and specifying the first channel ID in the A-control field.

According to some embodiments, setting the indication comprises specifying an operating class to indicate a regulatory domain of the first channel and identifying a primary channel of an operating BSS in the first channel.

According to a different embodiment, a wireless communication device is disclosed, including a processor, a first transceiver configured to perform wireless communication on a first channel; and a second transceiver configured to perform wireless communication on a second channel. The processor causes the wireless communication device to perform a method of generating a first Media Access Control (MAC) address for the first transceiver and generating a second MAC address for the second transceiver, constructing an Additional Authentication Data (AAD) using the first MAC address, encrypting a first frame using the AAD, the first transceiver and the second transceiver performing clear channel assessment (CCA) independently of each other, obtaining a first transmission opportunity (TXOP) on the second channel after encrypting, and in the first TXOP, the second transceiver transmitting the first frame on the second channel for receipt by a second wireless STA. The transmitting is performed without re-encrypting the first frame after obtaining the first TXOP.

According to some embodiments, the method further includes encrypting a second frame using the AAD, obtaining a second TXOP on the first channel wherein the second TXOP is concurrent with the first TXOP, and the first transceiver transmitting the second frame to the second wireless STA simultaneously with the second transceiver transmitting the first frame.

According to some embodiments, the first transceiver and the second transceiver are operable to enable the first wireless STA to communicate with the second wireless STA in a full duplex manner.

According to some embodiments, the first channel is associated with a first set virtual access points (APs) and the second channel is associated with a second set of virtual APs. The first and second sets have a same Basic Serve Set Identifier (BSSID) set. The method further comprises selecting a first virtual AP from the first set and a second virtual AP from the second set that have a same BSSID, and associating the second transceiver with the first virtual AP and the second transceiver with the second virtual AP, and wherein the AAD is constructed using the same BSSID.

According to some embodiments, the first channel is associated with a first set virtual access points (APs) and the second channel is associated with a second set of virtual APs. The first and second sets have different Basic Serve Set Identifier (BSSID) sets that are derived from a single reference BSSID, and constructing the AAD includes deriving a common BSSID for first set and second set of virtual APs.

According to some embodiments, the deriving comprises masking selected bits of each BSSID in the different BSSID sets to a same value.

According to some embodiments, the method further includes constructing a different AAD using the second MAC address, encrypting a third frame using the different AAD, obtaining a third TXOP on the first channel wherein the third TXOP is concurrent with the first TXOP, and the first transceiver transmitting the third frame to the second wireless STA simultaneously with the second transceiver transmitting the first frame.

According to some embodiments, the method includes setting an indication in a MAC header of the first frame to signal the second wireless STA to use channel information associated with the first channel for decryption and relay detection.

According to some embodiments, the channel information comprises Pairwise Transparent Key security Association (PTKSA), Group Transparent Key security Association, (GTKSA), Packet Number (PN) and relay counters, and the method includes maintaining respective channel information for the first channel and the second channel.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Encryption Mechanism Used in Multi-Band Channel Access

Embodiments of the present disclosure are described in detail with reference to the formats and structures of Physical Layer Convergence Protocol (PLCP) protocol data unit (PPDUs), data frames, control frames and management frames as defined in the high efficiency (HE) wireless local area (WLAN)-based IEEE 802.11 family of Specifications and Standards. However, the present disclosure is not limited to any specific transmission formats or structures, nor limited to any specific industry standards or specifications.

The IEEE 802.11 standards provide several distinct radio frequency (RF) ranges for use in WIFI communications. These WIFI bands include 900 MHz, 2.4 GHz, 3.6 GHz, 4.9 GHz, 5 GHZ, 5.9 GHz and 60 GHz bands. Each band is divided into a multitude of channels. Prevalent WIFI devices operate on 26 MHz centered around 915 MHz, about 100 MHz centered around 2.450 GHz and four sub-bands in the 5 GHz band. Currently, Wireless-B and Wireless-G devices operate on 2.4 GHz; and high throughput (HT), very high throughput (VHT), and HE devices can operate on 2.4G Hz and 5 GHz.

Embodiments of the present disclosure can be applied in a cooperative multi-band architecture that enables full duplex operations of wireless stations (STAs). Such an STA includes a WIFI transceiver and one or more additional transceivers. The two transceivers (and the associated channels) operate in mutually exclusive WIFI bands or different types of protocols and therefore can transmit and/or receive simultaneously without signal interference to each other. The multiple transceivers in an STA can perform independent clear channel assessment (CCA) and then simultaneously perform signal transmission or reception jointly or independently. In a cooperative multi-band operation, one channel may be used as an independent assistant channel and is responsible for receiving, collecting, or otherwise supplying, assistant information relevant to a transmission opportunity (TXOP) for the other channel (primary channel) to take various actions with regard to the TXOP. Alternatively, coordinated by a cooperative management unit (CMU) in the STA, the multiple channels in the STA may jointly and simultaneously perform data transmission or reception as peers.

Herein the terms "dual-band," "multi-band," "simultaneous dual-band" or "simultaneous multi-band" operations or devices may refer to the usage of mutually exclusive WIFI bands, such as selected from 2.4 GHz, 5 GHZ, and 6 GHz, which naturally does not cause wireless interference issues. The terms may also refer to the usage of a WIFI band in combination with another type of wireless protocol, such as Wi-Fi direct, Zigbee, Z wave, Bluetooth, RF, 6LowPAN, or GPRS/3G/LTE, for instance.

In some embodiments, a cooperative multi-band operations described herein can be within the 5 GHz or the 6 GHz band alone. For example, any multiple 20 MHz channels can be aggregated for wideband transmission. In this mode, full duplex may not be allowed. The transmissions on different channels are synchronized.

Figure 1:
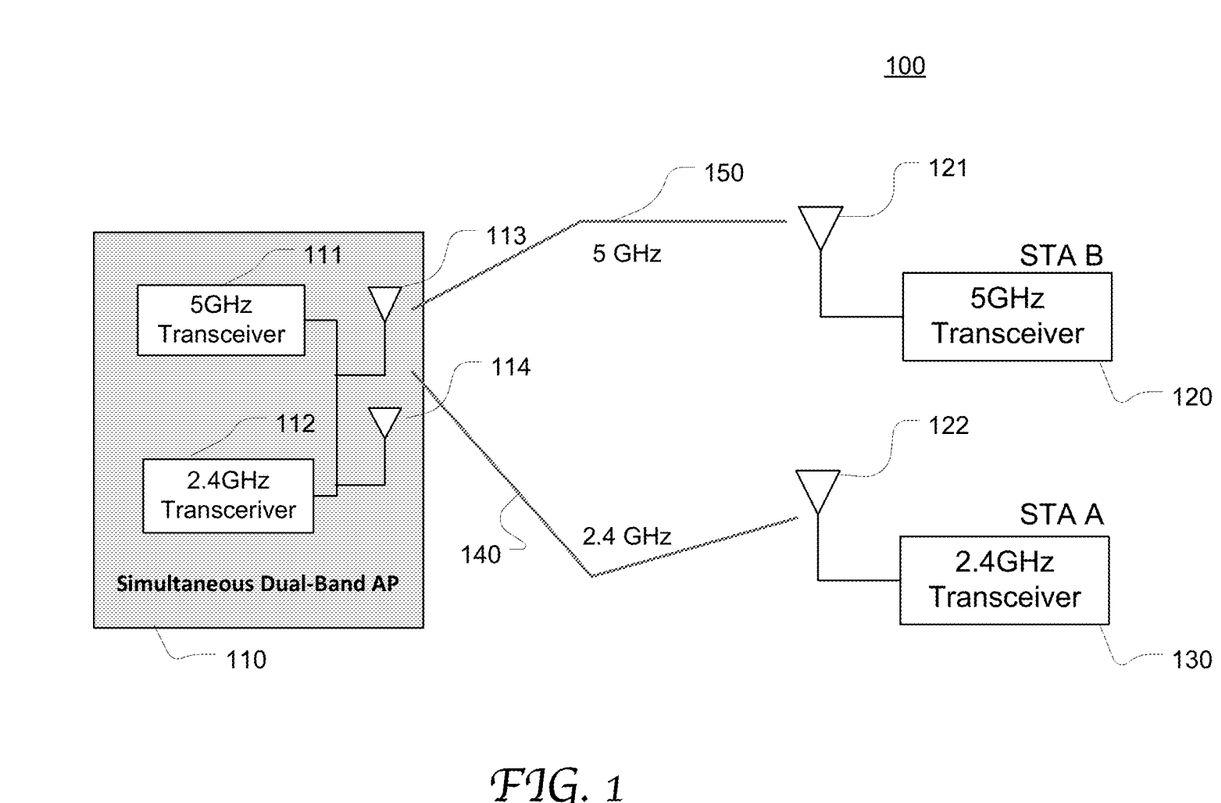
FIG. 1 illustrates an exemplary WLAN in which an exemplary station (STA) has two transceivers and is configured to communicate with the other STAs in full duplex mode through channels encompassed in two mutually exclusive WIFI bands in accordance with an embodiment of the present disclosure.

FIG. 1 illustrates an exemplary WLAN 100 in which an exemplary station (STA) 100 has two transceivers 111 and 112 and is configured to communicate with the other STAs 120 and 130 in full duplex mode through channels encompassed in two mutually exclusive WIFI bands in accordance with an embodiment of the present disclosure. In this simplified example, the WLAN 100 forms a basis service set (BSS) and includes a dual-band AP 110 and non-AP STAs 120 and 130. According to embodiments of the present disclosure, the dual-band AP 110 is equipped with 5 GHz and 2.4 GHZ WIFI transceivers 111 and 112, each coupled with an antenna 113 or 114. Through the channels 150 and 140 which are respectively encompassed in the two WIFI bands, the two transceivers can be advantageously actively engaged in signal transmission or reception at the same time without signal interference. In this example, STA A 130 and STA B 120 each have a single transceiver, respectively operating in 2.4 GHz and 5 GHz channels 150 and 140. Thus, each STA 120 or 130 only communicates with a corresponding transceiver in the AP 110. At the AP 110, one transceiver can transmit signals in a transmission opportunity (TXOP) while the other one is receiving signals with regard to the same TXOP through non-interfering channels, which in effect advantageously enables the AP to operate in full duplex manner.

In some embodiments, a cooperative management unit (CMU) within the STA is configured to coordinate multi-band operations between the multiple transceivers in the STA. The CMU may function to facilitate information or data exchange between the transceivers, or aggregate or fragment data so that they can be transmitted or received via different bands. In some embodiments, a cooperative multi-band operation involves independent data transmission or reception by using the multiple bands, where data fragmentation or data aggregation may be performed by the CMU. In some embodiments, the CMU can coordinate a multi-band operation in which an STA transmits data packets by using joint coding across all the bands. In some other embodiments, an STA can transmit data packets by using independent coding on each band. In this case, multiple encoders and decoders are needed in the STA. In some embodiments, one channel is used as an auxiliary (referred to as "independent assistance channel (IAC)" herein) and provides assistance information to the primary channel, such as reporting channel conditions and buffer status.

Figure 2:
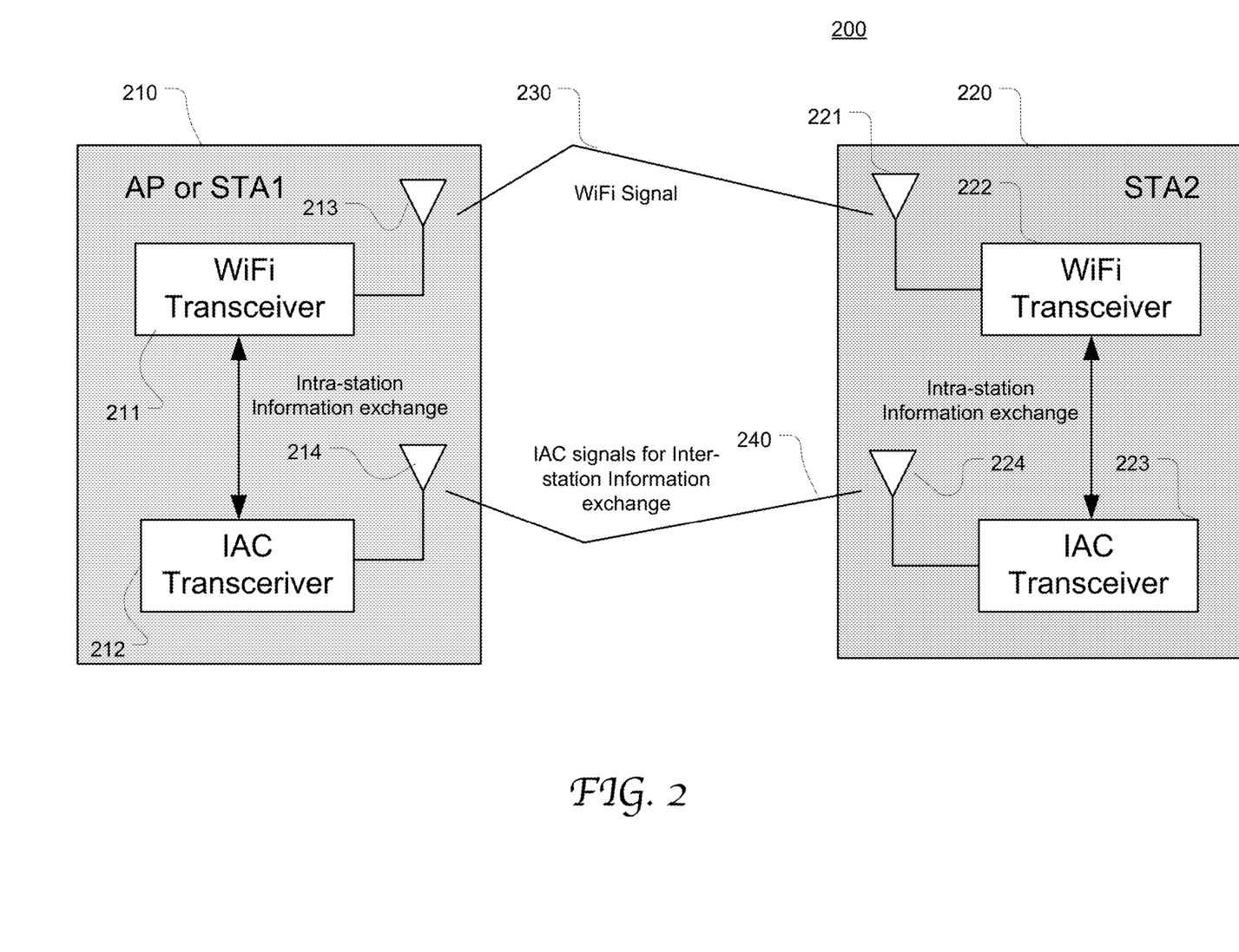
FIG. 2 illustrates an exemplary WLAN in which an exemplary dual-band STA has two transceivers and is configured to communicate with another dual-band STA in full duplex in accordance with an embodiment of the present disclosure.

FIG. 2 illustrates an exemplary WLAN 200 in which an exemplary dual-band STA 210 has two transceivers 211 and 212 and is configured to communicate with another dual-band STA 220 in full duplex mode in accordance with an embodiment of the present disclosure. Each STA 210 or 220 can transmit and receive at the same time, and can be either an AP STA or a non-AP STA. Each transceiver 211, 212, 222 or 223 in an STA 210 or 220 is operable to communicate with a corresponding transceiver in the other STA which uses the same WIFI band and/or the same protocol. Each transceiver is associated with an antenna 213, 214, 221 or 224.

In this example, the WIFI transceivers 213 and 222 are used for the primary channel 230 for data communication while the transceivers 212 and 223 are IAC transceivers used for the IAC 240. In some embodiments, the IAC transceivers 212 and 223 may be WIFI transceivers operating on different WIFI bands from the primary transceivers 211 and 222. In some other embodiments, the IAC transceivers 212 and 223 may operate on a different transmission mechanism, such as ultra-wide band transmission, or a frequency hopping scheme. Particularly, the transceivers 212 and 223 can be a different type of transceiver, such as a Wi-Fi direct, Zigbee, Z wave, Bluetooth, RF, 6LowPAN, or GPRS/3G/LTE transceiver, for instance.

When the two channels in separate bands are all CCA clean, one channel is used as the IAC to assist the transmissions on the other channel. The two transceivers in each STA perform independent CCA on the mutually exclusive channels prior to a multi-band operation. For example, CCA performed on a channel in 2.4 GHz band and CCA performed on a channel in 5 GHz band.

During operation, WIFI signals and the IAC signal can be transmitted simultaneously in the WLAN 200 because the transmissions are performed on separate channels and separate transceivers. Particularly, the IAC may be used to exchange control or other assistance information between the STAs 210 and 220 and supply the information to the primary transceivers via intra-station information exchange. The assistance information can be utilized by the primary transceivers to take actions for various purposes, as described in greater detail below. In some embodiments, the assistant information provided by the IAC transceivers is not essential to the WLAN operations. If such information is not supplied correctly, the WLAN can fall back to use only the primary channel and operate in the conventional manner.

By using dual-band operations, an individual STA can receive and transmit at the same time, and therefore there is no need for "listen-before talk" or "time-controlled listen-before-talk" operations. Eliminating the need for these operations can significantly and advantageously enhance the efficiency of the WLAN.

In a multi-channel access system, a transmit STA can obtain an TXOP for a particular band at a time, or obtain contemporaneous TXOPs in multiple bands to transmit frames in these bands simultaneously and cooperatively. Like in the single band access system, in a multi-band access system, it is also desirable to perform encryption on a frame before an TXOP is acquired. However, in the latter system, until a TXOP is obtained, the transceivers on both the transmit and the receive ends (as well as the associated channel) to be used for transmitting the specific frame remain undetermined. That is, the band to be used changes dynamically. Since each of the multiple transceivers has a different Basic Service Set Identifier (BSSID) and thus its own MAC address, it is difficult to predict which MAC address should be used to construct the Additional Authentication Data (AAD) in the encryption process before the TXOP is obtained.

Embodiments of the present disclosure provide a multi-band channel access protocol which allows a transmitter to encrypt a frame before a TXOP is acquired and to transmit the encrypted frame without the need for re-encryption. To encrypt the frame, an AAD can be constructed by using a selected MAC address, which is not necessarily associated with the band eventually used for transmitting the frame in an upcoming TXOP. Using such protocol, an STA that supports simultaneous transmission through multi-band operation can use the same MAC address for the multiple bands.

A TID-to-Link Mapping element is optionally present if the station is configured such that dot11MultiLinkActivated is set to true. If dot11MultiLinkActivated is true, for both the transmitter and the intended receiver of the MPDU, either the "To DS" or "From DS" subfields in the MAC header of the MPDU is set to 1, and the MPDU is an individually addressed Data frame between an AP MLD and a non-AP MLD associated with the AP MLD. In this case the first address field of the MPDU "A1" is set to the MLD MAC address of the intended receiver MLD of the MPDU. Otherwise, A1 is set to MPDU Address 1 field. Between an AP MLD and a non-AP MLD associated with the AP MLD, the second address field "A2" is set to the MLD MAC address of the transmitting MLD of the MPDU. Otherwise, A2 is set to MPDU Address 2 field.

Figure 3:
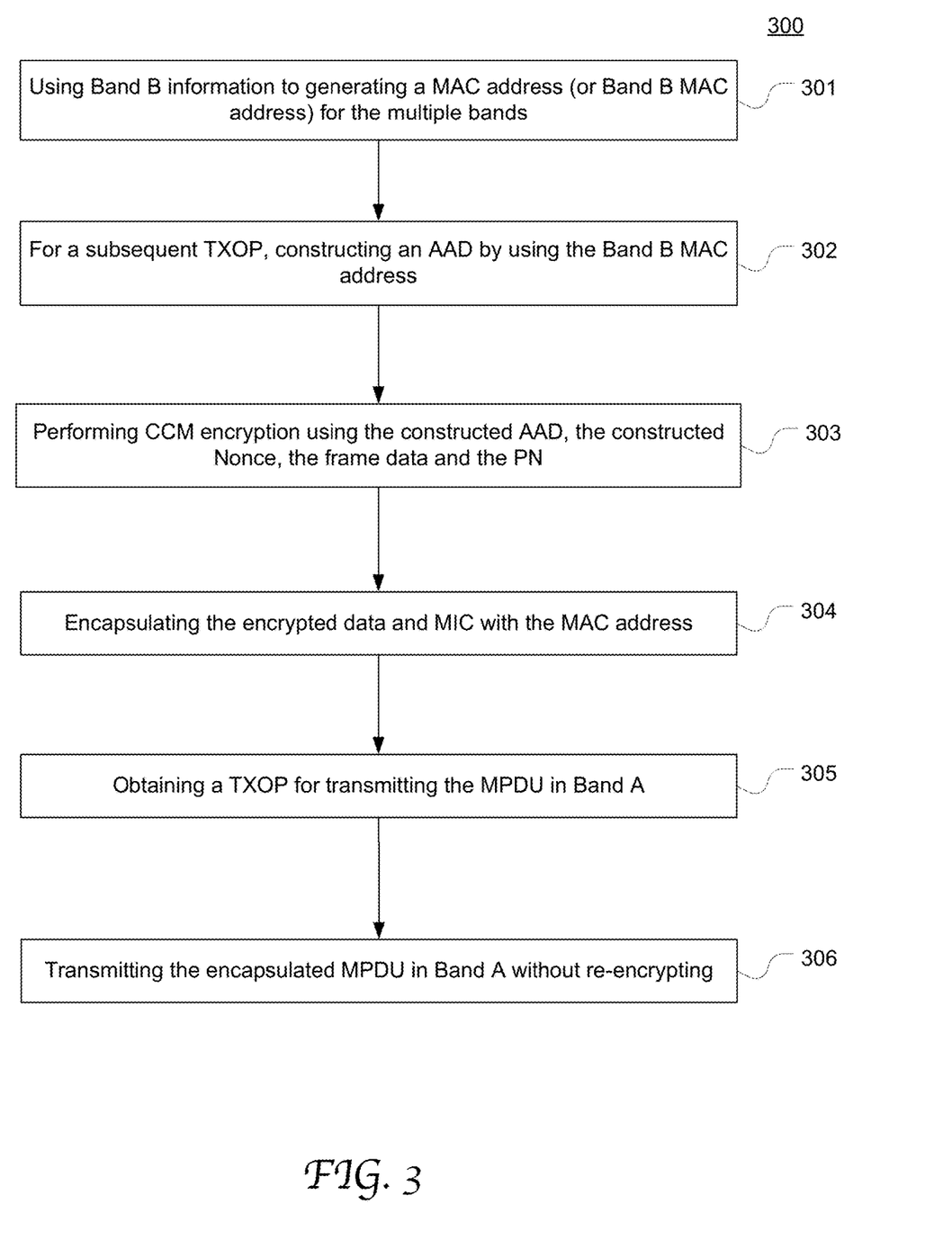
FIG. 3 is a flow chart depicting an exemplary process of encapsulating a MAC Protocol Data Unit (MPDU) before gaining a TXOP in a multi-band access operation in accordance with an embodiment of the present disclosure.

FIG. 3 is a flow chart depicting an exemplary process 300 of encapsulating a MAC Protocol Data Unit (MPDU) before gaining a TXOP in a multi-band access operation in accordance with an embodiment of the present disclosure. Process 300 may be performed in the case of a single transceiver transmitting an MPDU in an TXOP, or multiple transceivers transmitting MPDUs in contemporaneous TXOPs. In this example, the transmit STA has transceivers A and B operating on band A and band B, respectively. The transmit STA can be an AP or a non-AP STA. Each transceiver maintains a single PN (e.g., a 48-bit counter) for each PTKSA and GTKSA. The PN may be implemented as a 48-bit incrementing integer, initialized to 1 when the corresponding TK is initialized or refreshed, for instance.

At 301, while which band will be used for transmitting the MPDU is uncertain, the STA generates a MAC address by using the information of band B, including the RA, TA and BSSID of the transceiver B. This MAC address applies to frame transmission on the multiple bands. In the case of simultaneous transmission, this MAC address is identical for the MPDUs to be transmitted on both bands. At 302, for the subsequent TXOP, an AAD is constructed from the MAC header by using the generated MAC address. A nonce is constructed from the packet number (PN), transmit address (TA), and priority information contained in the MAC header. At 303, the CCM originator performs encryption on the MPDU by using the constructed AAD and nonce, the TK, the PN and plaintext frame body. As a result, encrypted data and a Message Integrity Check (MIC) are produced. At 304, the encrypted data and the MIC are encapsulated with the MAC address (obtained at 301). At 305, a TXOP is obtained for transmitting the MPDU in band A. At 306, the encapsulated MPDU is transmitted on band A in the TXOP without re-encrypting despite that it was encrypted by using the band B information. The receive STA is capable of decrypting the MPDU by using the correct information. In the case of simultaneous transmission on both bands, the MPDUs transmitted on both bands are encrypted by using the same MAC address generated at 301.

Therefore, according to embodiments of the present disclosure, an MPDU can be encrypted using the information associated with a selected band to construct the AAD, regardless of which band is actually to be used for transmitting the MPDU. This advantageously eliminates the need for re-encrypting after obtaining an TXOP.

In some embodiments, each band is associated with a respective set of multiple virtual access points (APs) configured on an AP STA, and the set of multiple virtual APs may have different BSSIDs or co-located BSSIDs. In one scenario, the multiple sets of virtual APs corresponding to the multiple bands have the same BSSID sets. A non-AP STA that uses the multi-band operation can associate with a select group of virtual APs, one virtual AP in each band, that have a same BSSID and thus a same MAC address. The receive STA can accordingly decrypt the frames by using this MAC address. For instance, an AP has following multiple BSSIDs configuration. A BSSID set of the AP on 2.4 GHz includes:

BSSID1 for virtual AP1 (transmitted BSSID)
BSSID2 for virtual AP2 (non-transmitted BSSID)
BSSID3 for virtual AP3 (non-transmitted BSSID)
BSSID4 for virtual AP4 (non-transmitted BSSID).

Another BSSID set of the AP on 5 GHz is the same and includes:

BSSID1 for virtual AP5 (transmitted BSSID)
BSSID2 for virtual AP6 (non-transmitted BSSID)
BSSID3 for virtual AP7 (non-transmitted BSSID)
BSSID4 for virtual AP8 (non-transmitted BSSID).

For contemporaneous TXOPs in a multi-band access operation, if an STA chooses to be associated with the virtual AP2 on 2.4 GHz, the STA should be associated with the virtual AP6 on the 5 GHz because they have the same BSSID, namely BSSID2.

In another scenario, the multiple set of virtual APs corresponding to the multiple bands have different BSSID sets, where a virtual AP in a band may not have a corresponding virtual AP in a different band that has the same BSSID. If the different BSSIDs are derived from a single reference BBSID (e.g., "REF_BSSID"), a common BSSID can be derived from the different BSSIDs and used for constructing a same AAD, which is used for encryption at the transmit STA and decryption at the receive STA. For example, An AP has the following multiple BSSIDs configuration. The BSSID set on 2.4 GHz includes:

BSSID1a for virtual AP1 (transmitted BSSID)
BSSID2a for virtual AP2 (non-transmitted BSSID)
BSSID3a for virtual AP3 (non-transmitted BSSID)
BSSID4a for virtual AP4 (non-transmitted BSSID).

Another BSSID set of the AP on 5 GHz is different and includes:

BSSID1b for virtual AP5 (transmitted BSSID)
BSSID2b for virtual AP6 (non-transmitted BSSID)
BSSID3b for virtual AP7 (non-transmitted BSSID)
BSSID4b for virtual AP8 (non-transmitted BSSID).

In some embodiments, since each BSSID is composed of a common prefix and a differential portion, a mask can be applied to differential portions of the different BSSIDs to convert the different BSSIDs to a common BSSID. For example, if the differential portion in each BSSID is located in the last n least-significant-bits (LSBs), where n represents an integer, the n LSBs of the BSSID can be masked to "0" to result in a value that is the identical for all the BSSIDs. When the BSSID is used in either RA or TA, the mask is applied on the "RA" field or the "TA" field in the AAD construction. It will be appreciated that any other suitable method of converting different BSSIDs into a common BSSID for constructing an AAD can be used without departing from the scope of the present disclosure.

Figure 4:
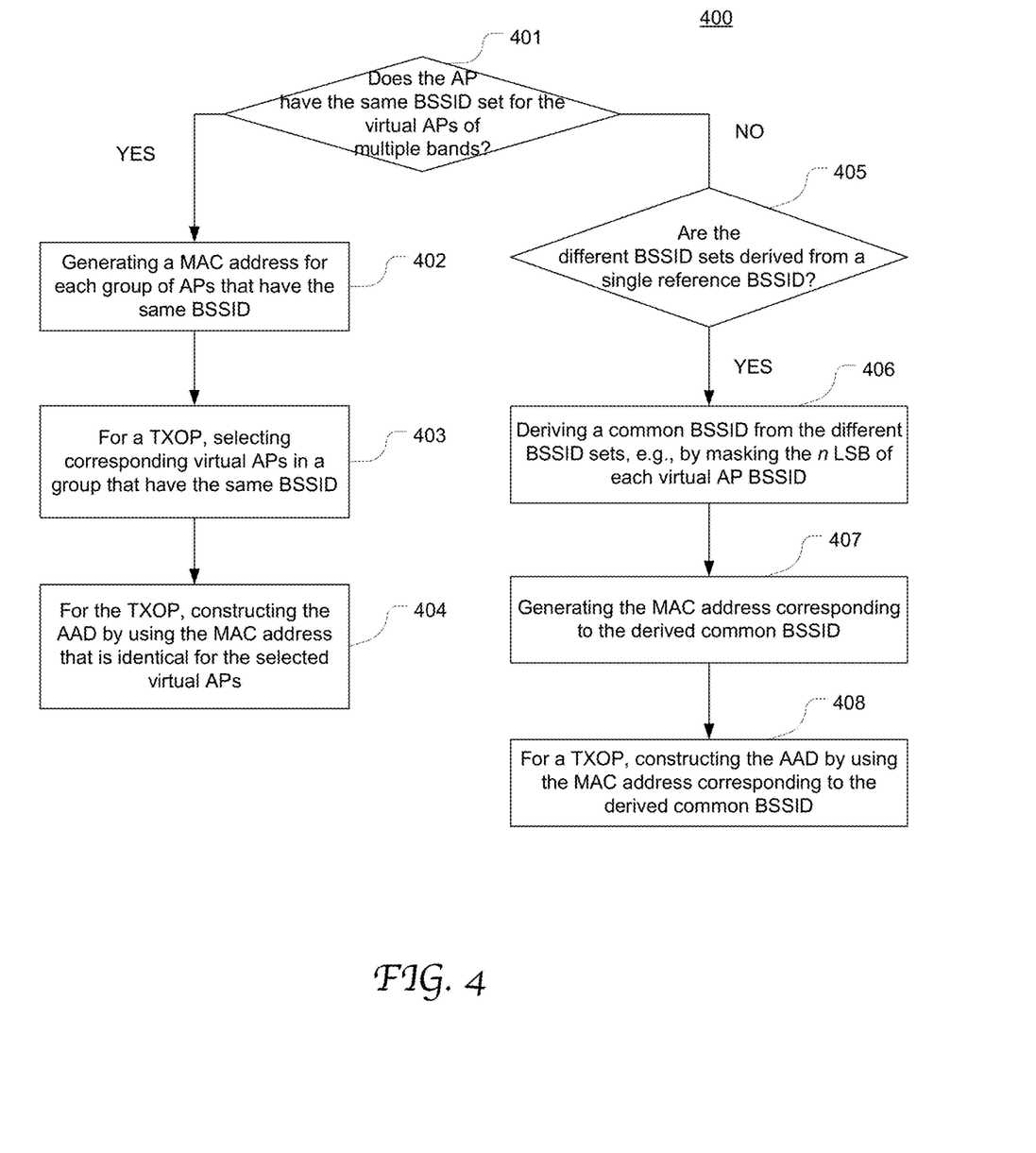
FIG. 4 is a flow chart depicting an exemplary process of constructing a MAC address based on the virtual AP BSSIDs for encryption in a multi-band access operation in accordance with an embodiment of the present disclosure.

FIG. 4 is a flow chart depicting an exemplary process 400 of constructing a MAC address based on the virtual AP BSSIDs for encryption in a multi-band access operation in accordance with an embodiment of the present disclosure. The AP is configured as virtual APs and each band may be associated with multiple virtual APs. The AP operates the virtual APs with multiple BSSIDs or co-located BSSIDs. At 401, a transmit STA determines whether the virtual APs on the multiple bands have the same BSSID. If yes, at 402, a MAC address is generated for each group of virtual APs that have the same BSSID. At 403, for a TXOP, the STA actively associates with corresponding virtual APs in the multiple bands that have the same BSSID. At 404, for the TXOP, an AAD is constructed by using the MAC address that is identical for the selected virtual APs, each corresponding to a respective band.

On the other hand, if the AP has different BSSID sets for the multiple bands, it is further determined (at 405) whether the different BSSID sets are derived from a single reference BSSID. If yes, at 406, a common BSSID is derived from the different BSSID sets, for example by masking the n LSBs of each virtual AP BSSID. At 407, a MAC address corresponding to the derived common BSSID is generated. At 408, for a TXOP, an AAD is constructed by using the derived MAC address. In this way, the transmit STA uses the same MAC address to encrypt frames for all the bands.

In some other embodiments, an STA may use and maintain different Pairwise Transient Key Security Association (PTKSA) and Group Transient Key Security Association (GTKSA) in multiple bands. The packet number and relay counters are also independently maintained on different transceiver/bands. When the STA transmits frames through a multi-band operation, the receive STA needs to determine which band's RA, TA, BSSID, temporal key (TK), packet number (PN) and relay counters are used on the decryption and the relay protection. According to embodiments of the present disclosure, a transmit STA can specify band information used for encryption in the MAC header regardless of which band is actually used for transmission. This serves to signal the receive STA to decrypt the frame by using the proper information. Advantageously, it offers flexibility for a transmit STA to use the MAC address or other information associated with any band or any virtual AP to encrypt an MPDU.

Figure 5:
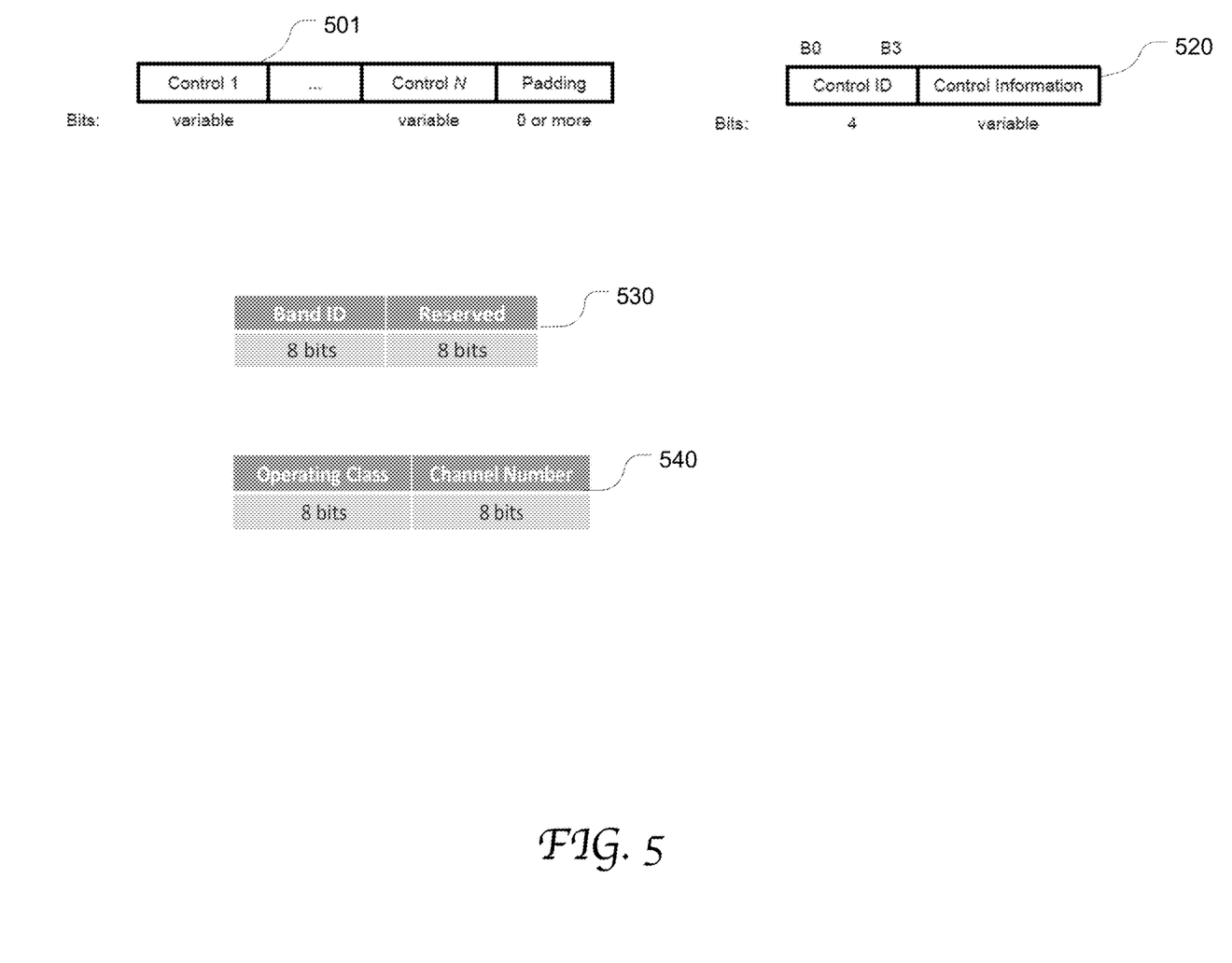
FIG. 5 shows exemplary signaling mechanisms for explicitly identifying the band information used for encrypting an MPDU in accordance with an embodiment of the present disclosure.

FIG. 5 shows exemplary signaling mechanisms for explicitly identifying the band information used for encrypting an MPDU in accordance with an embodiment of the present disclosure. Diagram 501 shows the format of the A-control subfield of the HE variant HT control field. Diagram 520 shows the format of the control subfield. One control ID value in the A-control field can be used to indicate multi-band content of a frame, e.g., the frame is transmitted in a multi-band access operation; and the control information subfield specifies the ID of the band whose information is used to encrypt the frame.

Diagram 530 shows an exemplary format of the control information subfield for multi-band for indicating the band information. For example, the "Band ID" field is defined to contain one of 7 possible values: "0" representing TV white spaces, 1 representing Sub-1 GHz excluding TV white spaces, "2" representing 2.4 GHz, "3" representing 3.6 GHz, "4" representing 4.9 and 5 GHz, "5" representing 60 GHz and "6" representing 6 GHz. It means that the MPDU is encrypted for the band indicated by the Band ID. So, a receive STA can use the TA, RA, BSSID, TK, PN and replay counters associated with the band indicated by the Band ID when it performs the decryption and the replay detection. Based on this indication in the MAC header, the receive STA can use the TK, PN, and relay counters associated with the band to perform decryption and relay detection.

Diagram 540 shows another exemplary format of the control information subfield for multi-band for indicating the band information. The operating class field (e.g., 8 bits) is used to specify the regulatory domain of the band and a channel number field (e.g., 8 bits) is used to specify the primary channel of the operating BSS in the band. The combination of information represents that the instant MPDU is encrypted for the band indicated by the operating class and the channel number fields. Therefore, a receive STA can use the RA, TA, BSSID, TK, PN and relay counters associated with the band as identified by the operating class and the channel number fields for decryption and relay detection.

For example, when an STA encrypts a frame based on the RA, TA and BSSID associated with the 5 GHz band and it transmits the frame in the 2.4 GHz band, the MAC header in the transmitted frame may have different address field values than the addresses used in the encryption operation. When the received frame contains a multi-band A-control field and the band indicated in this field is different than the receive band of the frame, the receive STA can use the address field values associated with the band to perform decryption and relay detection.

Figure 6:
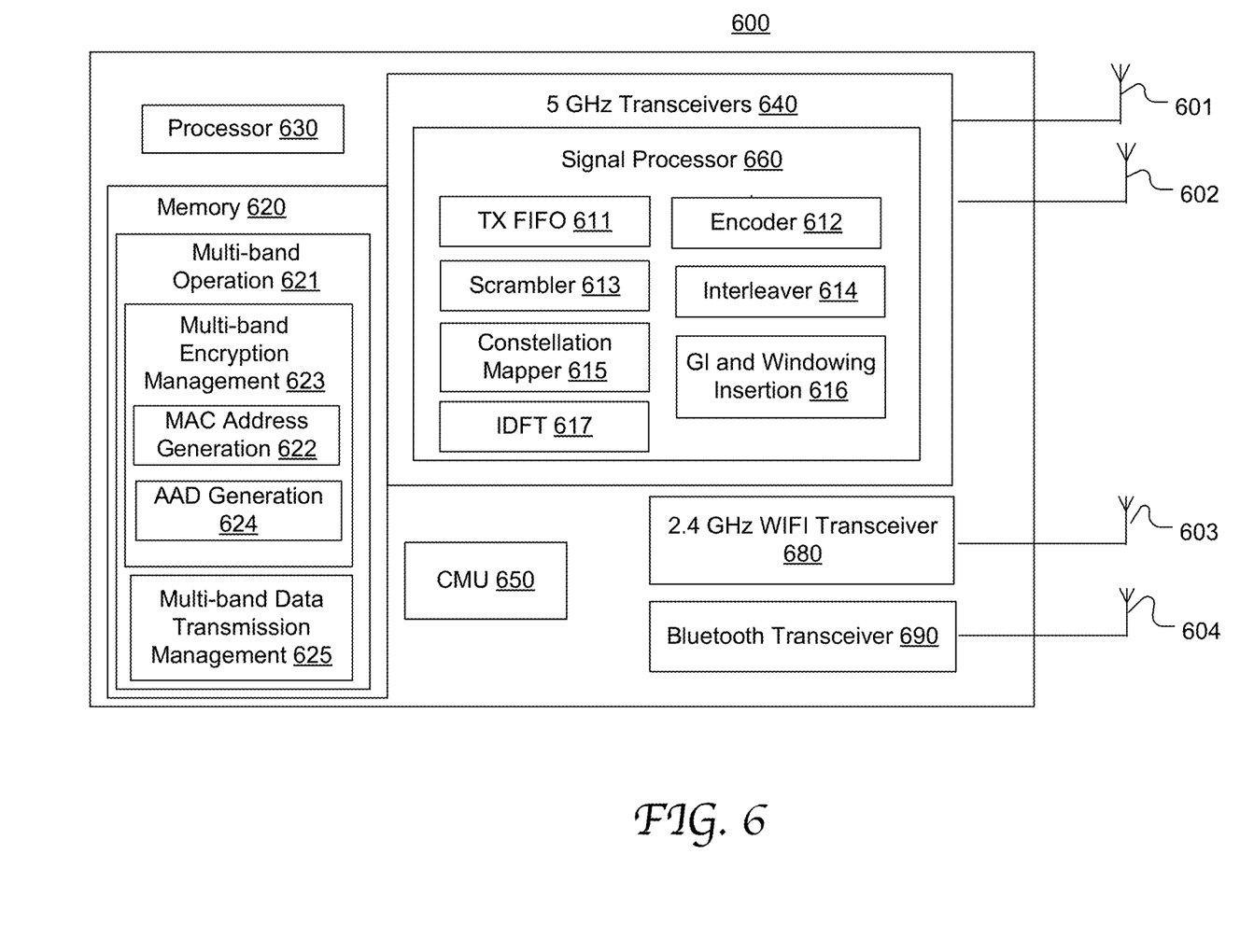
FIG. 6 is a block diagram illustrating an exemplary wireless communication device capable of performing encryption prior to obtaining a TXOP in cooperative multi-band operations in full duplex mode in accordance with an embodiment of the present disclosure.

FIG. 6 is a block diagram illustrating an exemplary wireless communication device 600 capable of performing encryption prior to obtaining a TXOP in cooperative multi-band operations in full duplex in accordance with an embodiment of the present disclosure. The communication device 600 may be an AP, a repeater, or a non-AP device, having a transceiver configured for data communication, e.g., a general purpose computer, a smart phone, a tablet, wearable device, a sensor used on Internet of Things (IoT), and etc.

The device 600 includes a processor 630, a memory 620, a 5 GHZ WIFI transceiver 640 coupled to an array of antenna 601-602, a 2.4 GHZ WIFI transceiver 680 coupled to the antenna 603, a Bluetooth transceiver 690, and a CMU 650. The CMU 650 is configured to control and coordinate the cooperative multi-band operations among the transceivers 640, 680, 690, for example by performing data fragmentation or data segregation, intra-STA information exchange, switching from using one transceiver to another, etc.

The CMU 650 can control the transceivers 640, 680 and 690 to operate in a primary-auxiliary manner or as peer transceivers with respect to a TXOP. The CMU 650 may be implemented by using circuit hardware, software, firmware or a combination thereof, and may be controlled by the instructions stored in the memory 620.

The memory 620 includes a multi-band operation management module 621 having instructions and information related to using the transceivers 640, 680 (and/or 690) to receive assistant information to the device in a TXOP. Based on the information, the transceiver 640 may take corresponding actions with regard to TXOP.

The multi-band encryption module 623 has instructions and information to encrypt MPDUs when the band to be used in the upcoming TXOP is uncertain. A MAC address generation module 622 is operable to generate a MAC address used for constructing an AAD by the AAD generation module 624, as described in greater detail with reference to FIGS. 3-5.

A multi-band data transmission management module 625 as instructions and information related to performing data segregation and fragmentation such that data transmission in an TXOP can be offloaded from one transceiver to another. It will be appreciated that the memory 620 has various other modules related to cooperative multi-band operations, as well as other function modules that are well known in the art.

The transceiver 640 includes various modules of the transmit path which are configured to generate data packets, control frames, or any other type of communication transmission units for transmission to another STA. For instance, it has a transmit First-In-First-Out (TX FIFO) 611, an encoder 612, a scrambler 613, an interleaver 614 a constellation mapper 615, an inversed discrete Fourier transformer (IDFT) 617, and a GI and windowing insertion module 616. The transceiver 640 also includes various modules of a receive path configured to receive data packets, control frames, or any other type of communication transmission units from another STA. The WIFI transceiver 680 may have a similar configuration as the transceiver 640. The Bluetooth transceiver may be implemented in any suitable manner that is well known in the art. As noted above, one or more of any other types of wireless transceivers that are well known in the art can be integrated in the device 600 and perform cooperative multi-band operations to enable the device to communicate with the other device in a full duplex manner.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication performed by a first wireless station (STA) comprising at least a first transceiver and a second transceiver, the method comprising:

generating a first Media Access Control (MAC) address for the first transceiver and a second MAC address for the second transceiver;
constructing an Additional Authentication Data (AAD) by using the first MAC address;
encrypting a first frame using the AAD;
the first transceiver and the second transceiver performing clear channel assessment (CCA) independently of each other;
obtaining a first transmission opportunity (TXOP) on a second channel after the encrypting; and
in the first TXOP, the second transceiver transmitting the first frame on the second channel for receipt by a second wireless STA, wherein the transmitting is performed without re-encrypting the first frame after obtaining the first TXOP, wherein a first channel is associated with a first set of virtual access points (APs) and the second channel is associated with a second set of virtual APs, wherein the first set and the second set have a same Basic Serve Set Identifier (BSSID) set, and further comprising:
selecting a first virtual AP from the first set and a second virtual AP from the second set, wherein the first and second virtual APs have a same BSSID; and
associating the second transceiver with the first virtual AP and the second transceiver with the second virtual AP, and wherein the AAD is constructed using the same BSSID.

2. The method of claim 1, further comprising:
encrypting a second frame using the AAD;
obtaining a second TXOP on the first channel, wherein the second TXOP is concurrent with the first TXOP; and
the first transceiver transmitting the second frame for receipt by the second wireless STA wherein the second frame is transmitted simultaneously with the second transceiver transmitting the first frame.

3. The method of claim 2, wherein the first transceiver and the second transceiver are operable to enable the first wireless STA to communicate with the second wireless STA in a full duplex manner.

4. The method of claim 1, wherein further the constructing the AAD comprises deriving a common BSSID for the first set and the second set of virtual APs.

5. The method of claim 4, wherein the deriving comprises masking selected bits of each BSSID in different BSSID sets to a same value and wherein further the different Basic Serve Set Identifier (BSSID) sets of the first set and the second set are derived from a single reference BSSID.

6. The method of claim 1, further comprising:
constructing a different AAD using the second MAC address;
encrypting a third frame using the different AAD;
obtaining a third TXOP on the first channel wherein the third TXOP is concurrent with the first TXOP; and
the first transceiver transmitting the third frame to the second wireless STA simultaneously with the second transceiver transmitting the first frame.

7. The method of claim 6, further comprising setting an indication in a MAC header of the first frame to signal the second wireless STA to use channel information associated with the first channel for decryption and relay detection.

8. The method of claim 7, wherein the channel information comprises Pairwise Transparent Key security Association (PTKSA), Group Transparent Key security Association, (GTKSA), Packet Number (PN) and relay counters, and further comprising maintaining respective channel information for the first channel and the second channel.

9. The method of claim 7, wherein the setting the indication comprises:
setting a control ID value in an A-control field to indicate multi-channel content in the first TXOP; and
specifying a channel ID for the first channel in the A-control field.

10. The method of claim 7, wherein the setting the indication comprises:
specifying an operating class to indicate a regulatory domain of the first channel; and
identifying a primary channel of an operating BSS in the first channel.

11. A wireless communication device, comprising:
a processor;
a first transceiver configured to perform wireless communication on a first channel; and
a second transceiver configured to perform wireless communication on a second channel, wherein the processor causes the wireless communication device to perform a method of:
generating a first Media Access Control (MAC) address for the first transceiver and generating a second MAC address for the second transceiver;
constructing an Additional Authentication Data (AAD) using the first MAC address;
encrypting a first frame using the AAD;
the first transceiver and the second transceiver performing clear channel assessment (CCA) independently of each other;
obtaining a first transmission opportunity (TXOP) on the second channel after the encrypting; and
in the first TXOP, the second transceiver transmitting the first frame on the second channel for receipt by a second wireless STA, wherein the transmitting is performed without re-encrypting the first frame after obtaining the first TXOP, wherein the first channel is associated with a first set of virtual access points (APs) and the second channel is associated with a second set of virtual APs, wherein the first and second sets have a same Basic Serve Set Identifier (BSSID) set, and wherein the method further comprises:
selecting a first virtual AP from the first set and a second virtual AP from the second set that have a same BSSID; and
associating the second transceiver with the first virtual AP and the second transceiver with the second virtual AP, and wherein the AAD is constructed using the same BSSID.

12. The wireless communication device of claim 11, wherein the method further comprises:
encrypting a second frame using the AAD;
obtaining a second TXOP on the first channel wherein the second TXOP is concurrent with the first TXOP; and
the first transceiver transmitting the second frame to the second wireless STA simultaneously with the second transceiver transmitting the first frame.

13. The wireless communication device of claim 12, wherein the first transceiver and the second transceiver are operable to enable a first wireless STA to communicate with the second wireless STA in a full duplex manner.

14. The wireless communication device of claim 11, wherein the first set and the second set have different Basic Serve Set Identifier (BSSID) sets that are derived from a single reference BSSID, and wherein further the constructing the AAD comprises deriving a common BSSID for the first set and the second set of virtual APs.

15. The wireless communication device of claim 14, wherein the different BSSID sets are derived by masking selected bits of each BSSID in the different BSSID sets to a same value.

16. The wireless communication device of claim 11, wherein the method further comprises:
   constructing a different AAD using the second MAC address;
   encrypting a third frame using the different AAD;
   obtaining a third TXOP on the first channel wherein the third TXOP is concurrent with the first TXOP; and
   the first transceiver transmitting the third frame to the second wireless STA simultaneously with the second transceiver transmitting the first frame.

17. The wireless communication device of claim 16, wherein the method further comprises setting an indication in a MAC header of the first frame to signal the second wireless STA to use channel information associated with the first channel for decryption and relay detection.

18. The wireless communication device of claim 17, wherein the channel information comprises Pairwise Transparent Key security Association (PTKSA), Group Transparent Key security Association, (GTKSA), Packet Number (PN) and relay counters, and the method further comprises maintaining respective channel information for the first channel and the second channel.

\* \* \* \* \*